(No Model.) 4 Sheets—Sheet 1.
J. EMERSON.
APPARATUS FOR REGULATING THE FLOW AND DELIVERY OF WATER THROUGH CANALS, FLUMES AND WATER WAYS.
No. 275,371. Patented Apr. 10, 1883.
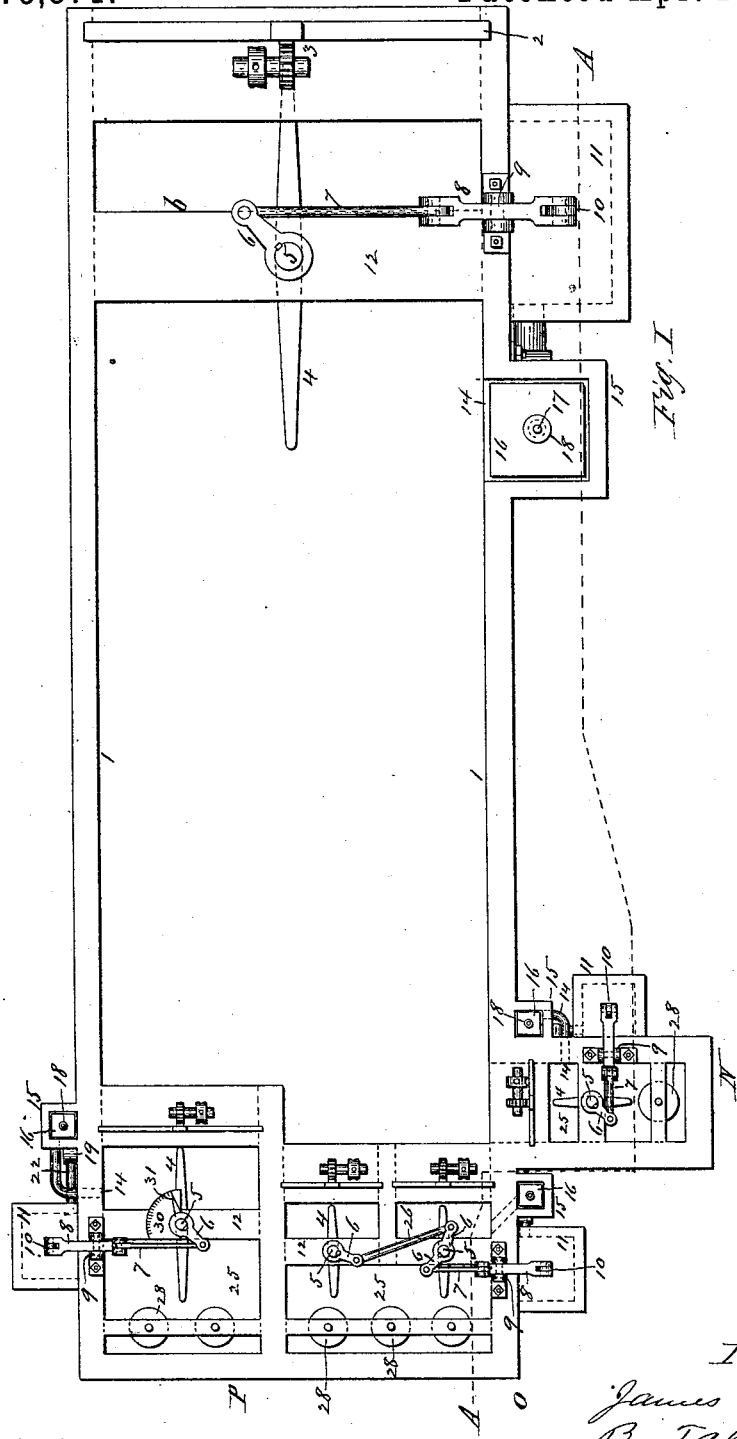
Fig. I.
Witnesses.
N. E. Dimmell.
Chas. H. Wood.
Inventor,
James Emerson,
By T. A. Curtis.
his atty.

(No Model.) 4 Sheets—Sheet 2.
J. EMERSON.
APPARATUS FOR REGULATING THE FLOW AND DELIVERY OF WATER THROUGH CANALS, FLUMES AND WATER WAYS.
No. 275,371. Patented Apr. 10, 1883.
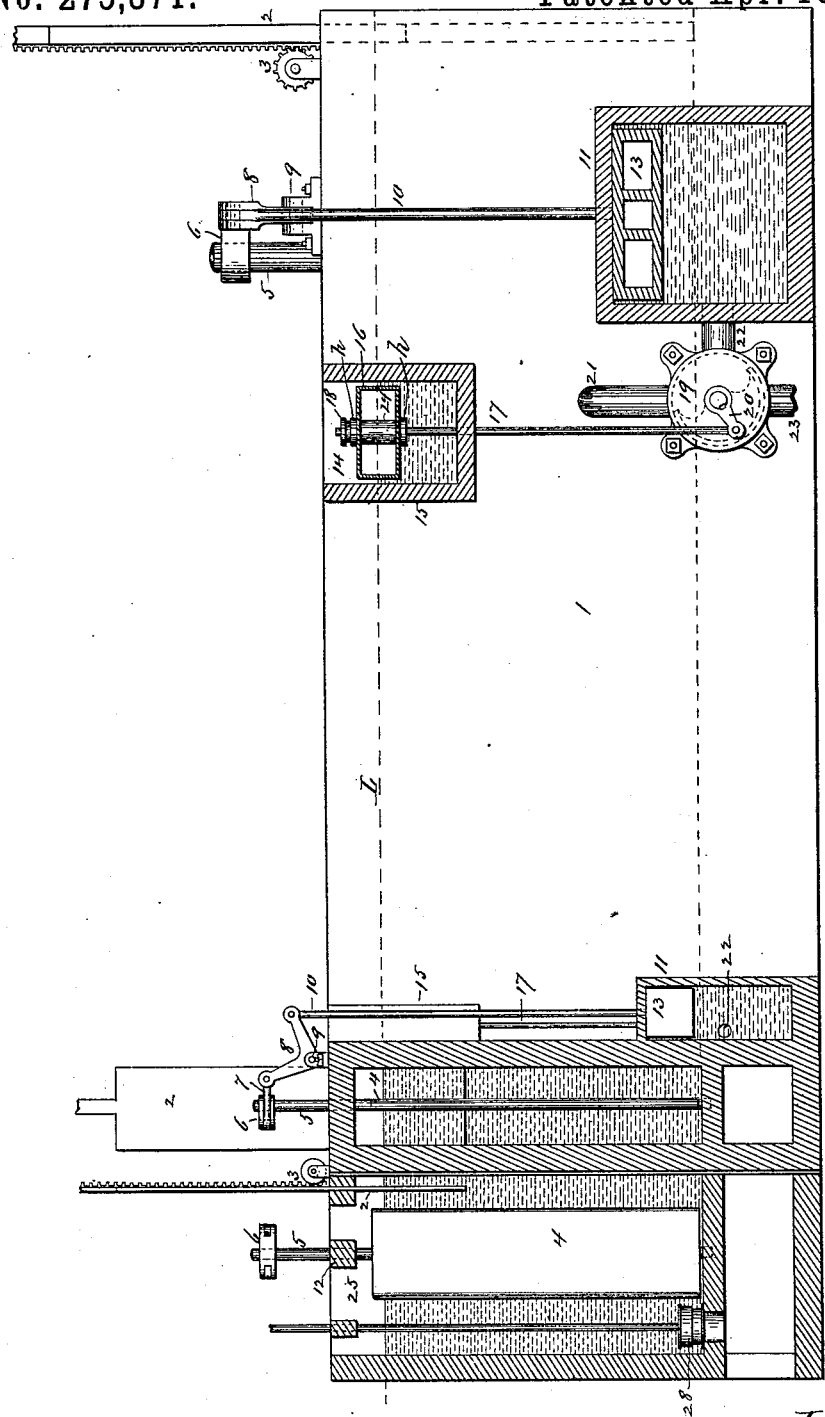
Fig. II
Witnesses.
N. E. Dwinnell.
Chas. H. Wood.
Inventor.
James Emerson.
By T. A. Curtis,
his Atty.

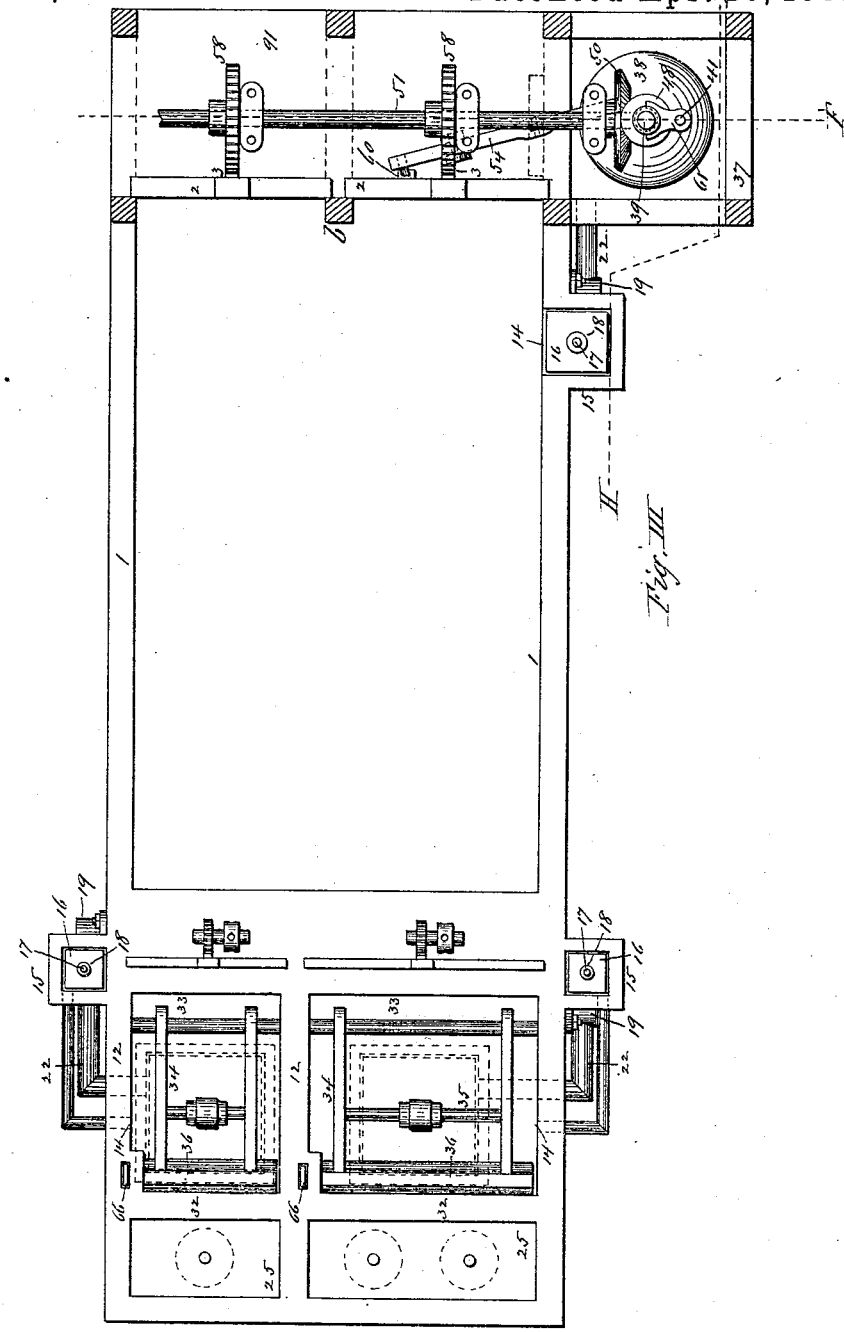

(No Model.) 4 Sheets—Sheet 4.
J. EMERSON.
APPARATUS FOR REGULATING THE FLOW AND DELIVERY OF WATER THROUGH CANALS, FLUMES AND WATER WAYS.
No. 275,371. Patented Apr. 10, 1883.
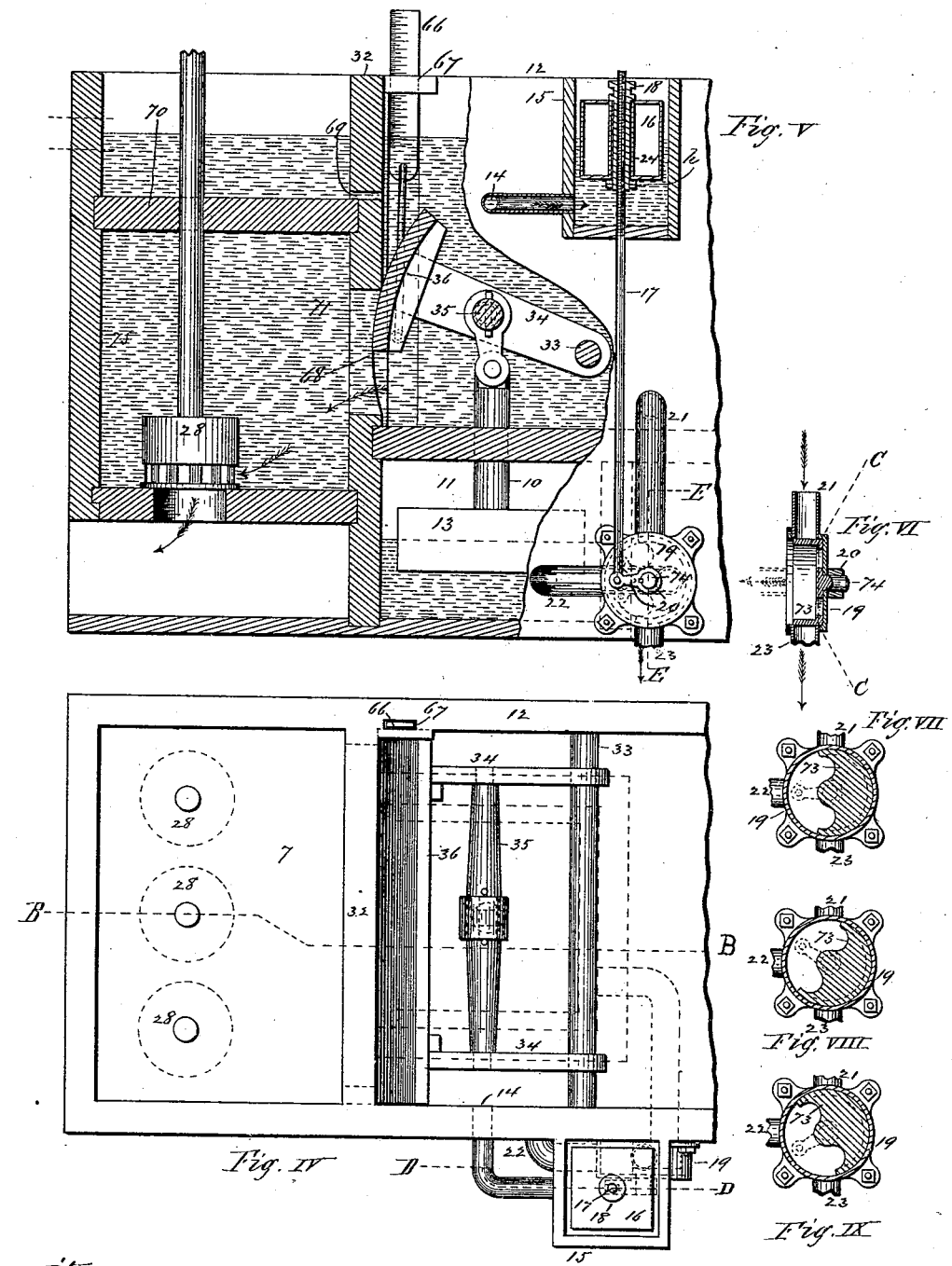

UNITED STATES PATENT OFFICE.

JAMES EMERSON, OF WILLIMANSETT, ASSIGNOR OF ONE-HALF TO THE HOLYOKE WATER POWER COMPANY, OF HOLYOKE, MASS.

APPARATUS FOR REGULATING THE FLOW AND DELIVERY OF WATER THROUGH CANALS, FLUMES, AND WATER-WAYS.

SPECIFICATION forming part of Letters Patent No. 275,371, dated April 10, 1883.

Application filed October 12, 1882. (No model.)

*To all whom it may concern:*

Be it known that I, JAMES EMERSON, of Willimansett, in the county of Hampden and State of Massachusetts, have invented a new and useful Apparatus for Regulating the Flow and Delivery of Water through Canals, Flumes, and Water-Ways, of which the following is a specification and description.

The object of my invention is, first, to maintain water in a canal or water-way at a uniform height during its passage to the outlet or flume; second, from this established uniform height of water in the canal or water-way to make a proportional division of the water at the outlets, giving to each consumer of water at his respective outlet the amount of water to which each is entitled, or a proportional amount of the whole to which each is entitled; third, to measure the amount given to each; and, fourth, to prevent any one of the consumers from using any more water than he is entitled to, the whole apparatus operating automatically, and being based on the fixed law that any given velocity of water is acquired through a corresponding loss of head.

This apparatus is applicable to be used at falls where the water is owned by several parties and is to be proportionally divided between them. It is also applicable for use where the water is owned by one company or owner, and is sold or leased, and a stated quantity is to be measured out to each purchaser or to each party leasing. It is also applicable for use for governing the flow of water from reservoirs, where water is stored for irrigation or for manufacturing purposes, and also for regulating the height of water in rivers or ponds to prevent backflowage in cases where movable dams or flash-boards are employed. I accomplish these objects by the apparatus substantially as hereinafter described, and illustrated in the accompanying drawings, in which—

Figure I is a plan view representing a canal, and showing my invention as applied to the operation of wicket-gates, or those pivoted in a vertical position at one end of the canal, for the head-gates, and also at the other end, or at the flumes, where the water would be drawn from the canal and used for manufacturing or other purposes. Fig. II is a vertical section of the same at line A of Fig. I. Fig. III is a plan view representing a canal provided with vertical sliding head-gates at one end, and the gates at the other end or in the flumes, where the water would be drawn from the canal for use, being pivoted to or hung upon a bar placed in a horizontal position. Fig. IV is an enlarged plan view of a flume and draft-tube, with a swinging gate hung in said flume and operated according to my invention in dividing and measuring the water drawn from the canal through said flume. Fig. V is a part vertical section of the same at line B of Fig. IV, showing the swinging gate and the lifting-float which operates it and the draft-tube, and also a part vertical section at line D of Fig. IV, showing the construction of the governing-float which operates the valve controlling the flow of water into and out of the tank containing the lifting-float. Fig. VI is a vertical section of the valve and its case, which controls the flow of water into and out of the tank containing the lifting-float, at line E of Fig. V. Figs. VII, VIII, and IX are sectional views representing details of the valve and its case as applied to and used at the flumes or outlets of the canal.

In the drawings, let 1 represent the side walls of a canal or water-way, at one end of which is made the ordinary bulk-head, as *b*, provided with gates, as 2, to admit the water into the canal or water-way when opened for that purpose.

The ordinary head-gates may be used; but in this application I have shown pivoted gates, as being more easily operated, this class of gates being shown, as at 4, pivoted at 5 in the bulk-head at one end of the canal, 1, and in the flumes at the opposite end of the canal, in Figs. I and II. In the use of this pivoted gate to control the flow of water, the gate being set in an upright position to turn upon its post 5 as a pivot, an arm, as 6, is secured to its upper end, to which is attached a horizontal rod, 7, connected with one arm of a bell-crank lever, 8, pivoted at 9, the other arm being connected with a vertical rod, as 10, extending through the top of a tank containing a float, 13, to which the lower end of the rod 10 is secured. A smaller tank, as 15, is made upon or is so connected with the canal or its side wall that the water may flow freely into said tank, either by making the side next the canal-wall open, as at 14, or by connecting said tank with the canal by a pipe, with its end opening into the canal, so that the water of the canal may flow through said pipe into the lower portion of the tank to fill the latter up to the same level as the water in the canal. This tank, as 15, I make preferably of rectangular form, and it contains a float, 16, which I make of a form in horizontal section to fit approximately the interior of the tank, but so that the float may move up and down freely, but not revolve therein. This float may be made of any suitable buoyant material; but I prefer to make it of some thin sheet metal, and hollow, and perfectly water-tight. A socket, as 24, extends vertically through this float, through which extends a rod, 17, whose upper end has a screw-thread made thereon, adapted to receive a nut, as 18, turned onto the upper end of the rod, with a shoulder, $h$, above and below the float, and this rod 17 extends down through the bottom of this tank, with its lower end attached to an arm, 20, secured to the hub of a valve, 73, inclosed within and fitting a cylindrical valve-case, 19, the hub extending out through the case at its axis. This valve-plug fits the interior of the case, so as to move freely therein, and is approximately of semi-cylindrical form, of sufficient extent in its circumference to cover the inlet and outlet ports in the case, and a pipe, 21, opens at one end into the canal and at the other end into the valve-case 19, at the periphery, at the upper side, so that the water may pass from the canal through this pipe into the valve-case. The opening of this pipe in the valve-case forms its inlet-port, and the opening of a pipe, 23, into the valve-case, on its lower side and nearly opposite the pipe 21, forms the outlet-port of the valve-case, this pipe or opening 23 being merely to permit the water to flow out of the valve-case and to conduct it away to some waste-conduit, if desired. Another pipe, 22, opening into the valve-case at the side, extends to and opens within the tank 11, preferably in its lower portion.

It will be seen by referring to Fig. VII that when the arm 20 (shown in dotted lines in that figure) is in a horizontal position the inlet port or opening of the lower end of the pipe 21 in the valve-case is closed, being covered by the upper end of the valve 73, and the opening of the upper end of the pipe 23 in the valve-case or outlet-port is covered by the lower end of the valve 73.

By referring to Fig. VIII it will be seen that when the arm 20 (shown in dotted lines) is inclined above a horizontal position the valve is moved so as to open the upper or inlet port and close the lower or outlet port, and when this arm is inclined below its horizontal position the upper or inlet port is closed and the lower or outlet port is opened, as shown in Fig. IX. Of course with the valve in this position shown in Fig. VII water can neither flow into the valve-case through the pipe 21 nor out of it through the pipe 23; but with the valve in the position shown in Fig. VIII water may flow into the valve-case through the pipe 21, and thence through the pipe 22 into the tank 11, to raise the float therein, and with the valve in the position shown in Fig. IX water may flow out of the tank 11 into the valve-case, and thence out through the pipe 23. It will be seen that by this construction of valve the latter may be moved with the least possible friction in its case, and a very slight change in the height of the water in the canal to change the vertical position of the float 16 will be sufficient to operate the valve to open or close the ports in its case.

Referring to Fig. II, suppose it is desired to maintain the water in the canal at the height indicated by the dotted line L. The permanent or sliding head-gates, as 2, are raised to give the desired opening for the water to flow in, and the nut 18 is turned onto the upper end of the rod 17 until the float 16 in the tank 15 is sustained at the height shown in Fig. II by the water which flows into said tank from the canal. While in this position the valve is held in the position shown in dotted lines in Fig. II, and the water flows from the canal through the pipe 21, case 19, and pipe 22 into the tank 11, raising the float 13 into the upper part of the tank and holding the pivoted gate 4 wide open, or in a position lengthwise the canal, as shown in Fig. I, so that the water may flow into the canal past the gate 4, on each side the latter; but as the float 16 is so adjusted, if the water should rise in the canal, the float 16 would be raised, and the arm 20 of the valve would be inclined above a horizontal position and the valve moved into a position to open the outlet-port into the pipe 23 and close the inlet-port from the pipe 21, and the water would flow out from the tank 11 through the pipes 22 and 23, and the valve and the float 13 would fall and close the gate 4, or partially close it, until the water should fall nearly to the desired level at the line L, and when the inlet port or pipe 21 began to open as the float 16 was lowered by the fall of the water the tank would be slowly filled again and the float 13 would rise, and the gate 4 would be gradually opened to keep up the supply of water in the canal. This float 16 may be so nicely adjusted by turning the nut 18 either up or down that the slightest rise of water in the canal, and consequently in the tank 15, will operate the float 16, and the valve and the gate 4 will be shut sufficiently to keep out the excess of water over that required for use in the canal. The gate 4 is always wide open as long as the water remains at the lowest desired level, and when the water rises above this level the gate 4 is partially shut.

The flumes, as 25, at the points along the canal where the water is drawn therefrom, may be supplied with the same kind of gate, 4, each of which is operated by a float, 16, valve and its case 19, and lifting-float 13 in the same manner as the head-gate is operated, as above described, except that the arm 6 is attached to the post or pivot 5 of the gate in an opposite position from that in which it is attached to said post or pivot at the supply end of the canal. These flume-gates also operate to partially close and prevent any excess of water from passing into the flume over that amount previously determined upon. For example, suppose a manufacturing establishment to be located at any point along the canal—say at N— and to draw the water from the canal through the flume containing the single gate 4 at that point. This flume is provided with a tank, 15, containing a valve-operating float, 16, like that hereinbefore described for the head-gate, into which tank the water may flow from the flume through a pipe whose orifice 14 opens into the flume, above the gate, in a direction opposite the flow of the current, and a valve and its case 19, like that above described for the operation of the head-gate, is connected with the float 16 by a rod, 17, with a tank connected by a pipe with said valve-case, and containing a lifting-float, as 13, which is connected with an arm, as 6, on the gate 4 in the flume by rods 10 and 7 and bell-crank lever 8, all as above described for the head-gate at the bulk-head.

It will be seen that in using the valve and its case 19 at the head-gate at the bulk-head b the arm 20 is so attached to the hub of the valve that as the float 16 is raised by the water in the tank 15 and in the canal the valve is moved so that the water may flow out of the tank 11, and by the falling of the lifting-float 13 the head-gate 4 will begin to close; but at the flumes the arm 20 is attached to the hub of the valve 73 in a reversed position, or as shown in dotted lines in Figs. V, VII, VIII, and IX, so that as the water falls in the flume the falling of the float 16 in the tank 15 would move the valve 73 into a position to permit the water to flow from the tank 11, and the lifting-float 13, in falling, would close the gate 4 in the flume 25.

In the above explanation I have referred to the details of the tanks and valve, as shown in Fig. I, at the head of the canal or bulk-head, because precisely the same arrangement is used at the flumes as at the bulk-head, with the exception that the arm 6 is attached to the pivot or post 4, and the arm 20 is secured to the valve 73 in a reversed position when applied and used at the flumes. For illustration, two other manufacturing establishments may be drawing water from the canal—one at O and another at P—and these flumes may be located any distance apart and along the side of the canal, or at its termination. For convenience I have represented them at the latter point, and side by side. Suppose that the party at N owns or has leased one-sixth of all the water which flows through the canal, the party at O three-sixths, and the party at P two-sixths, each flume-opening being of the proper area to permit that quantity of water to flow through at a given velocity—say of two feet per second. These flume-openings being the ordinary head-gates, they may be changed to give different areas of opening at different seasons of the year to meet the usual changes in the supply of water at such times, if found advisable. With the water at the height indicated by the line L the nut 18 on the rod 17 is turned so that the float 16 in the tank 15 holds the valve at the flume N in such a position that the float 13 in the tank 11 at that flume will hold its gate 4 in a position wide open, as shown in Fig. I. Inasmuch as the amount of water which can be drawn from a flume depends upon the velocity at the outlet of the flume at a given head, this additional use would tend to draw the water down or reduce its height in the flume, and the water in the tank 15 being always at the same level with that in the flume, the float 16 would fall and move the valve into a position to permit the water to flow out of the tank 11 through the pipe 22, valve 19, and outlet 23, and the lifting-float 13 would fall and partially shut the gate 4 in the flume, which would of course reduce the quantity of water passing into the flume at a greater velocity until his proper proportional quantity of one-sixth was reached, when the head and float would rise to their normal condition, allowing him still his proportional quantity, though at a loss of head in proportion to the quantity which he attempts to overdraw. In like manner the other owners or lessees at other points are governed or controlled in their use of water.

In Fig. I there are two gates in the flume at O, one of which is provided with a double arm, 6, one of whose ends is connected with the arm of the other gate by a rod, 26, and the other end is connected with the bell-crank lever 8, connected with the lifting-float 13 in the tank 11, so that the movement of said float will operate both gates at the same time.

The flumes may be provided with the ordinary lifting or vertically-sliding gates 2, which may be closed at any time for the purpose of making repairs in the flume, or for any other purpose.

The tanks 15, connected with all the flumes, should all be securely locked and be kept under the charge of one man, so that no other person could have access to them; or the tanks 15 might be all located in one building or office and each be connected with its flume by a pipe, and all locked and in charge of one person.

If desired, a dial, 30, having a graduated scale, may be placed in any convenient fixed position near the pivot or post 5 of each gate in the flume, with an index secured to the post, as shown at P in Fig. I, so that a glance at the index and dial at any time would show how far open each gate was as to the area of its aperture, so that a slight computation might give approximately the quantity of water passing through.

It will be seen that this apparatus furnishes a very reliable system of maintaining the water in a water-way or canal at a standard height to give a uniform head, and with that head, to divide the water flowing through, giving to each owner or lessee the quantity to which he is entitled, and preventing any attempt on the part of either owner or lessee from using a greater quantity than that to which he is entitled.

In Figs. III, IV, and V is shown a modification of the same invention as applied to gates arranged to move on a horizontal pivot for the purpose of measuring the amount of water passing through the gate-aperture, Figs. IV and V showing an enlarged detailed view, in which 33 represents a horizontal bar fixed in the sides of the flume, to which are hung, so as to swing freely thereon, the arms 34, whose free ends are secured to the gate 36. The outside of this gate should be made convex in its cross-section upon a curve whose radius is the distance from the outside of the gate to the horizontal bar 33, and the gate-aperture 71, made in front of the gate and through the front wall, 32, of the flume, should have its ends curved vertically, as at 68, so that the ends of the gate 36 should approximately fit the aperture when the gate is shut.

The tank 11 for the lifting-float 13, when applied to a swinging gate of this construction and used in the position shown in the drawings, is made beneath the floor of the flume, and the lifting-rod 10 in this case extends up through this floor, and may be connected with a cross-bar extending from one arm, 34, to the other of the gate 36, as shown in Figs. IV and V.

The chamber 75 for the wheels 28 may be covered by a horizontal partition, 70, if desired, with a small horizontal aperture, as 69, through the front wall, 32, of the flume, which would form a draft-tube in which the wheels were located, the water in the flume flowing through this aperture 69 and covering the horizontal partition 70, to pack the apertures to the wheel-chamber, these wheels representing those used by the establishment located at that point and drawing water from the canal.

A scale, 66, may extend up vertically in any convenient place, with its lower end pivoted to the end of the gate 36, and the graduations on the scale may indicate the vertical opening and fractions thereof of the gate-aperture. Suppose, for example, that the gate-aperture should be ten feet horizontally and two feet vertically, and a glance at the scale should indicate that the lower edge of the gate 36 was just one foot above the lower edge of the gate-aperture. It would require but a few minutes' computation, knowing the area of open aperture and velocity, to ascertain just how much water was flowing through the aperture beneath the gate, so that the quantity of water being used by the party drawing from that flume may be easily and accurately measured at any time by a glance at the scale to see how much it projects above the top of the wall of the flume or any other horizontal line across the scale as an indicator.

The operation of the float 16 within its tank 15, connected with the flume shown in Figs. III, IV, and V, and also the valve-case 19, connected with said float and with the tank 11 of the lifting-float 13, is precisely like that hereinbefore described as used in Figs. I and II, except that its action is reversed—that is to say, the tank is so connected with the flume in Figs. IV and V that the water may flow freely through the orifice 14 and the pipe leading therefrom into the tank 15, so that the float 16, being properly adjusted by the nut 18 on the rod 17 above the float, will be held at a certain height in the tank 15 by the water therein, the valve in the case 19 being held in a position to retain the proper quantity of water in the tank 11 to sustain the float 13 and gate 36 at such a height as to allow the quantity of water to flow through the gate-aperture 71 at the fixed velocity to which the party is entitled, at the given head which is maintained in the canal by the head-gates, as hereinbefore described. If the party wishes to use more water than that which would flow through the gate-opening 71 at a given velocity—say two feet per second—the water would begin to fall in that part of the flume in which the gate 36 is pivoted, and also would fall in the tank 15, owing to the increased velocity of the water passing through the gate-aperture 71, and the float 16 would fall and change the valve, so that the inlet from the pipe 21 would be opened and the outlet at 23 be closed, permitting the water to flow into the tank 11, raising the lifting-float 13 and opening the gate 36 to give a larger aperture and permit more water to pass through the gate-aperture 71 until the velocity was reduced to the stated two feet per second, and this increased opening of the gate-aperture would be accurately indicated by the scale, and the amount of water could then easily be computed. If the water in the reservoir should be exceedingly low, so that the water in the canal should remain at a much lower level than at the line L, the nuts on the rods 17 above the floats 16 are readjusted according to the height of water in the canal, and each party will then be able to draw his proportional quantity of the water, and no more, instead of his full quantity, as when the water is abundant.

It will be seen that when the float 16 is once adjusted for any certain height at which it is desired to maintain the water, by turning the nut 18 on the rod 17 either up or down, the float will operate automatically to move the valve into such a position as to regulate the amount of water retained in the lifting-tank 11 to operate the gate, and keep the proportions of the supply of water in the canal equal to the demand or amount used therefrom.

It will be seen that by merely reversing the position of the arm 20 on the hub of the valve 73 the falling of the water and the float 16 will operate the valve to permit the water to flow into the lifting-tank to close a gate, or to open it, according to the position in which the said arm is secured.

It is evident that in cases where a single individual, firm, or corporation owns all the water which runs in the canal or water-way, or owns the entire water privilege, and is only using from one flume, or when it is not desired to divide the water among the different flumes through which it is drawn from the canal to be used, but only to maintain the water in the canal or water-way at a uniform height, it may be done by using the apparatus as connected with the head-gates at the bulk-head alone. In any case, whether used at the head-gates or those in the flume, or both, the tanks 15, containing the operating-floats 16, together with their respective valves, and the pipes or water-connections should all be located under cover to avoid being frozen up in winter, and the tanks 15, with their floats 16, might be located conveniently in some office, and under the control of one man; and instead of taking the water from the canal into the tank 11 through the valve-case 19 and inlet 21, it may be taken from the reservoir or river by connecting the pipe therewith, if it should be more convenient.

Having thus described my invention, what I claim as new is—

1. The combination, with a tank having water-communication with a canal or water-way, of a valve-operating float adapted to move vertically in said tank, a valve connected with said float, a tank having a water supply and discharge passage connected with said valve, so that a flow of water into and out of said tank may be controlled by the valve, and a lifting-float adapted to be moved vertically in said tank, and adapted to operate a gate to open or close the gate-aperture, whereby the flow of water through the gate-opening is automatically controlled by the height of the water in said canal or water-way, substantially as described.

2. A hollow float, as 16, having a vertical tube, 24, in combination with a rod, 17, provided with a screw-thread at its upper end, and a threaded nut provided with a shoulder above and below said float, whereby said float may be raised or lowered upon said rod by turning the nut in one direction or the other, substantially as described.

JAMES EMERSON.

Witnesses:
T. A. CURTIS,
N. E. DWINNELL.